United States Patent
Ishibashi (10) Patent No.: US 9,229,179 B2
(45) Date of Patent: Jan. 5, 2016

(54) INTEGRATED OPTOELECTRONIC MODULE

(71) Applicant: NTT ELECTRONICS CORPORATION, Yokohama-shi, Kanagawa (JP)

(72) Inventor: Tadao Ishibashi, Yokohama (JP)

(73) Assignee: NTT Electronics Corporation, Kanagawa (JP)

( * ) Notice: Subject to any disclaimer, the term of this patent is extended or adjusted under 35 U.S.C. 154(b) by 15 days.

(21) Appl. No.: 13/919,854

(22) Filed: Jun. 17, 2013

(65) Prior Publication Data

US 2013/0343697 A1 Dec. 26, 2013

(30) Foreign Application Priority Data

Jun. 22, 2012 (JP) .................... 2012-141015

(51) Int. Cl.
*G02B 6/12* (2006.01)
*G02B 6/42* (2006.01)

(52) U.S. Cl.
CPC .......... *G02B 6/4214* (2013.01); *G02B 6/12002* (2013.01); *G02B 6/12004* (2013.01)

(58) Field of Classification Search
None
See application file for complete search history.

(56) References Cited

U.S. PATENT DOCUMENTS

| | | |
|---|---|---|
| 2004/0145026 A1 | 7/2004 | Sun et al. |
| 2005/0259935 A1 | 11/2005 | Hamada |
| 2007/0053627 A1 | 3/2007 | Hsu |
| 2008/0175531 A1 | 7/2008 | Fincato et al. |
| 2009/0046978 A1* | 2/2009 | Yasuda et al. .................. 385/31 |
| 2009/0202197 A1 | 8/2009 | Heinz-Gunter |
| 2012/0132792 A1 | 5/2012 | Choe et al. |

FOREIGN PATENT DOCUMENTS

| | | |
|---|---|---|
| JP | H03-290606 | 12/1991 |
| JP | 2002-328245 A | 11/2002 |
| WO | 2004/104662 | 12/2004 |

OTHER PUBLICATIONS

Hiroshi Ito et al., *Photonic Generation of Continuous $TH_z$ Wave Using Uni-Traveling-Carrier Photodiode*, Journal of Lightwave Technology, vol. 23, No. 12, Dec. 2005, pp. 4016-4021.

(Continued)

*Primary Examiner* — Jerry Rahll
(74) *Attorney, Agent, or Firm* — Workman Nydegger (57) ABSTRACT

An integrated optoelectronic module comprising: a semiconductor substrate; a single-mode optical waveguide comprising a semiconductor with a signal input section at a first end; a multi-mode optical waveguide comprising a semiconductor connected to a second end of the single-mode optical waveguide; and a photodiode disposed on and adjacent to the multi-mode interferometer waveguide and having at least one optical absorption layer section, wherein the single-mode optical waveguide, the multi-mode optical waveguide, and the photodiode being stacked on the semiconductor substrate, wherein the multi-mode interferometer waveguide comprises a reflection section formed by partly grooving the multi-mode interferometer waveguide, and an optical signal having propagated through the multi-mode interferometer waveguide is reflected by the reflection section and focused on the optical absorption layer section.

12 Claims, 9 Drawing Sheets

(56) References Cited

OTHER PUBLICATIONS

Andreas Beling et al., *High-Speed Miniaturized Photodiode and Parallel-Fed Traveling-Wave Photodetectors Based on InP*, IEEE Journal of Selected Topics in Quantum Electronics, vol. 13, No. 1, Jan./Feb. 2007, pp. 15-21.

Lucas B. Soldano et al., *Optical Multi-Mode Interference Devices Based on Self-Imaging: Principles and Applications*, Journal of Lightwave Technology, vol. 13, No. 4, Apr. 1995, pp. 615-627.

Sanjeev Murthy et al., *A Novel Monolithic Distributed Travering-Wave Photodector With Parallel Optical Feed*, IEEE Photonics Technology Letters, vol. 12, No. 6, Jun. 2000, pp. 681-683.

E. Rouvalis et al., *High-Speed Photodiodes for Inp-Based Photonic Integrated Circuits*, Optics Express, vol. 20, No. 8, Apr. 9, 2012, p. 9172.

Kyung-sook Hyun et al., *Multimode Interferometer-Fed InGaAs Waveguide Photodiode for High Power Detection*, Japanese Journal of Applied Physics, vol. 47, No. 11, Nov. 14, 2008, pp. 8426-8429.

Ian D Henning et al., *Novel Antenna-Integrated Photodiodes With Strained Absorbers Designed for Use as Terahertz Sources*, IEEE Journal of Selected Topics in Quantum Electronics, vol. 17, No. 1, Jan. 2011, pp. 202-209.

European Search Report in related European Patent Application No. 13172950.1, dated Oct. 4, 2013.

Office Action, dated Jul. 30, 2015, in corresponding Japanese Application No. 2012-141015.

* cited by examiner

INTEGRATED OPTOELECTRONIC MODULE

CROSS-REFERENCE TO RELATED APPLICATIONS

This application claims the benefit of Japanese Patent Application No. 2012-141015, filed Jun. 22, 2012, which is hereby incorporated by reference herein in its entirety.

BACKGROUND OF THE INVENTION

1. Field of the Invention

The present invention relates to an integrated optoelectronic module, and more specifically, to an integrated optoelectronic module that is used for a high-frequency photodiode.

2. Description of the Related Art

A photodiode intended for high frequency operations within a THz frequency range of 0.3 THz to 3 THz needs to have a small device capacitance and thus requires a reduced junction area. This is because the level of degradation of responses associated with an RC time constant increases consistently with frequency and because the width of a depletion layer inevitably needs to be reduced in order to make intrinsic responses of the photodiode faster, that is, to shorten an internal carrier transit time, leading to an increase in capacitance per unit area. A basic constraint in this case is that a reduced device size decreases an upper limit on a possible operating current for a photodiode according to the junction area.

Thus, a large number of photodiodes each with a very small junction size needs to be arranged in an array to combine power from the individual photodiodes to increases general power (power combiner). Several methods are available for inputting optical signals into the arrayed photodiodes. However, when the photodiode has a reduced junction size, the conventional technique involves many problems with a packaging technique for the arraying, an optical coupling technique required for the arraying, and the like.

CONVENTIONAL EXAMPLE 1

For example, if a lens optics focuses an incident optical beam on a photodiode, when an optical fiber has an output beam spot size of 8 µm (a 1.5 µm band is used) and a 4:1 magnification optics is used for the focusing, the beam spot size becomes about 2 µm. Even when the junction diameter of the photodiode is reduced to a value equivalent to the beam spot size, appropriate responsivity can be achieved. So, optical coupling to a single photodiode may be possible. However, such a coupling conditions need to be set so as to simultaneously satisfy the magnification of the optics and the focus, disadvantageously complicating adjustment for practical optical packaging.

Furthermore, in an "antenna integrated photodiode" including a photodiode and an antenna integrated on the same substrate, a THz free-space optics needs to be configured, and thus, a photodiode chip is disposed directly on a THz spherical lens. Thus, the photodiode is sandwiched between an optical lens and the THz spherical lens, making the input of optical signals into a back-illuminated photodiode difficult. The back-illuminated photodiode inevitably needs to be used because an upper electrode has a very small size, that is, a micron size, preventing a sufficient optical coupling efficiency from being achieved in spite of provision of an optical input window.

Figures 8A, 8B:
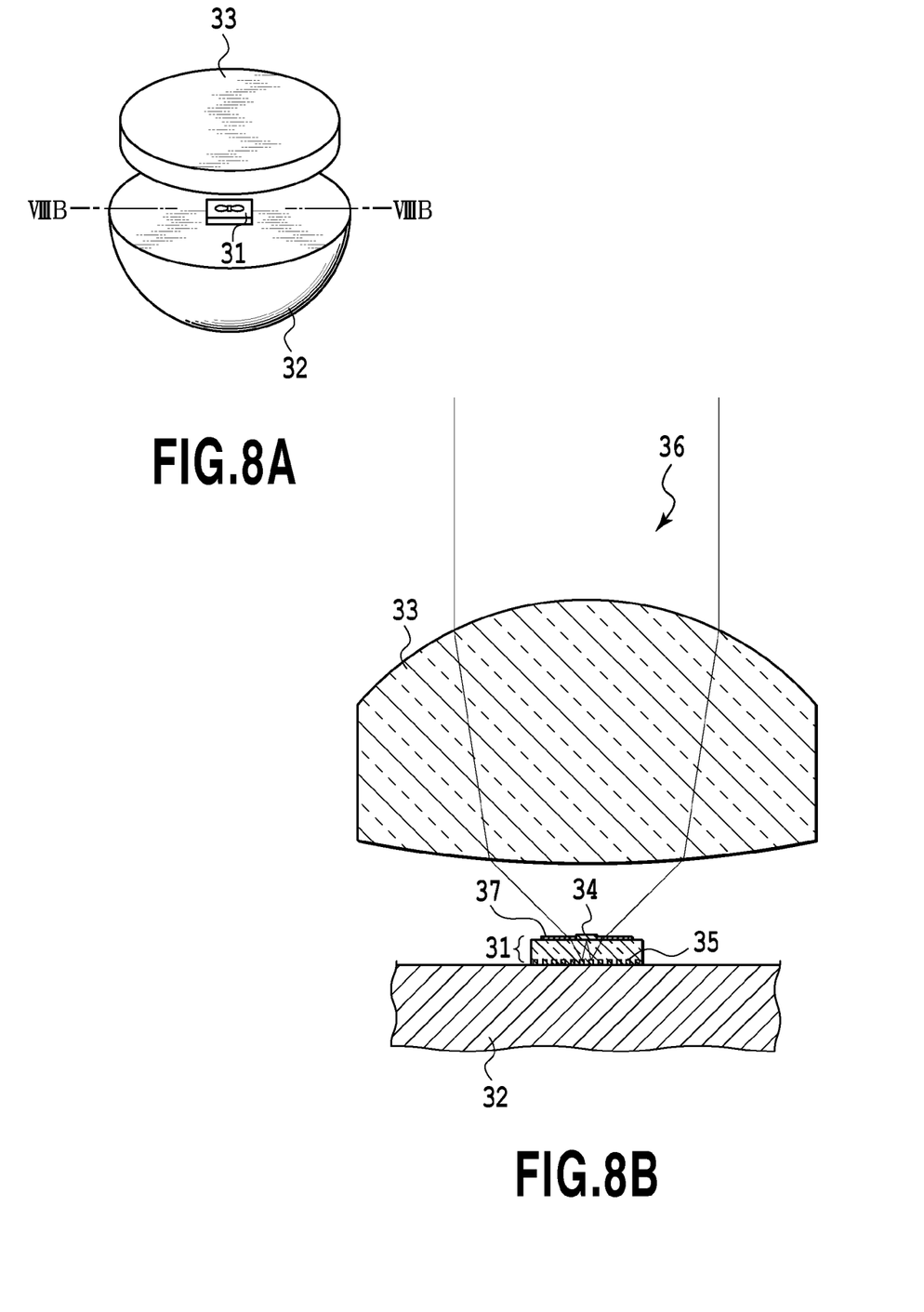
FIG. 8A shows arrangement relations among components.
FIG. 8B shows detailed arrangement relations.

FIGS. 8A and 8B show an example of optical coupling to a conventional antenna integrated photodiode using an optical lens. The example of optical coupling shown in FIGS. 8A and 8B are described in, for example, NPL 1 in detail. A photodiode chip 31 is fixed on an Si hyper hemispherical lens 32. An optical signal is focused on a photodiode portion 34 using an optical lens 33. The photodiode has a back illuminated structure, so that an incident optical beam 36 is folded by a reflective coating 35 on a back surface of the photodiode. Optical coupling is possible, but an optical signal is considerably blocked by a metallic antenna pattern 37 and the photodiode portion 34 integrated on the photodiode chip 31. Thus, disadvantageously, the coupling efficiency is significantly decreases.

CONVENTIONAL EXAMPLE 2

A method (=optical waveguide/photodiode integrated structure) different from the above-described method using the lens optics involves integrating an optical waveguide with multiple branches and photodiodes coupled directly to the optical waveguide, on a semiconductor substrate. Compared to the lens optics, the optical waveguide/photodiode integrated structure is excellent in that optical coupling to one optical waveguide allows an optical signal to be simultaneously supplied to a large number of photodiodes. However, as far as the optical waveguide/photodiode integrated structure is conventionally on so called "evanescent optical coupling", it fails to achieve an appropriate coupling efficiency unless the photodiode has a somewhat large device length (=evanescent optical coupling length). Thus, the conventionally reported optical waveguide/photodiode integrated structure is difficult to apply to photodiodes with a small junction area.

Figure 9:
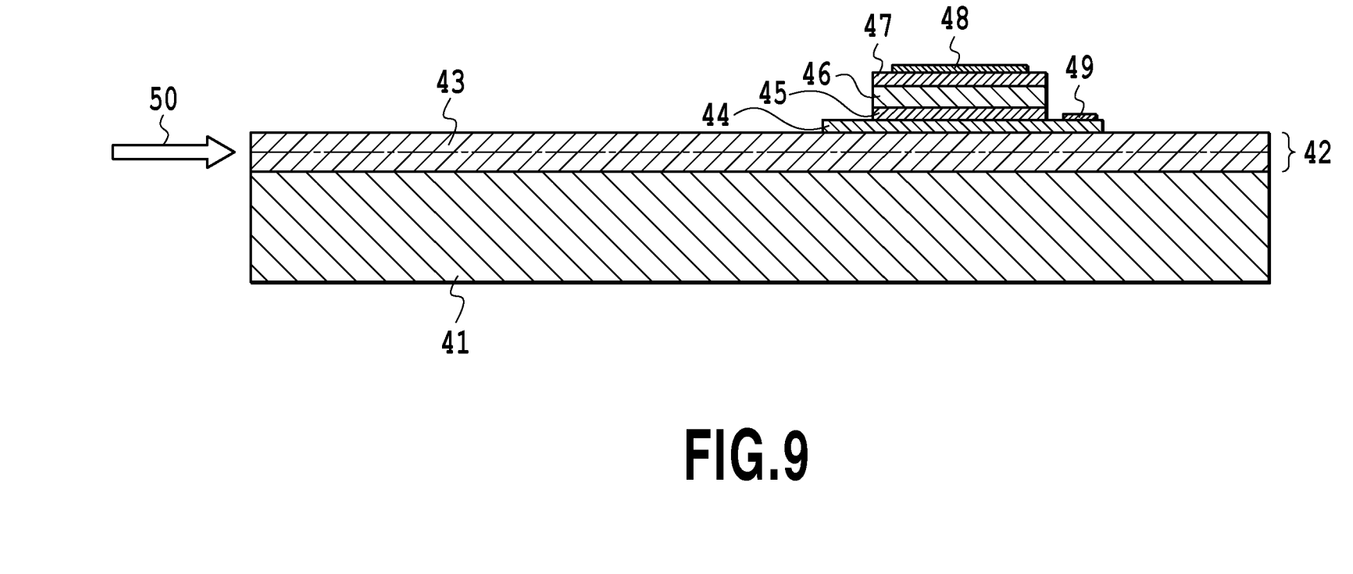
FIG. 9 is a diagram schematically showing a conventional evanescent optical coupling photodiode structure.

FIG. 9 schematically shows a conventional evanescent optical coupling photodiode structure. The conventional evanescent optical coupling photodiode structure includes a semi-insulating semiconductor substrate 41, an optical waveguide 42 disposed thereon, and an optical absorption layer 45, an upper clad layer 46, and a p-contact layer 47 formed on the optical waveguide 42 via a matching layer 44 sharing an n-contact layer with the waveguide 42. The evanescent optical coupling photodiode structure further includes a p-electrode 48 and an n-electrode 49. An optical signal 50 is coupled to the optical waveguide in a direction shown by an arrow and propagates around a core layer 43 stacked in an intermediate layer in the optical waveguide. The optical signal is converted into a waveguide mode including the optical absorption layer 45 via the matching layer 44 to carry out effective evanescent optical coupling. Normally, the size of the photodiode in an optical propagation direction is often sufficiently larger than an optical wavelength.

For example, according to MPL 2, the optical absorption layer (thickness: 0.2 µm) in a device with a width of 4 µm and a length of 7 µm achieves a relatively high responsivity of 0.37 A/W. However, simulation also indicates that a reduction in the length of the optical absorption layer rapidly decreases the sensitivity.

CONVENTIONAL EXAMPLE 3

As a technique for coupling a waveguide and a photodiode together, what is called a bud coupling structure, which is used to integrate a semiconductor laser and an electro-absorption optical modulator together, is in principle possible. However, there has been no reported example because the bud coupling structure involves a complicated technique for producing an epitaxial crystal.

CITATION LIST

Non-Patent Literature

NPL 1: Hiroshi Ito et al., J. Lightwave Tech. Vol. 23, NO. 12, pp. 4016-4021, 2005
NPL 2: A. Beling et al., IEEE J. OF SELECTED TOPICS IN QUANTUM ELECTRONICS, VOL. 13, NO. 1, pp. 15-21, 2007
NPL 3: L. B. Soldano et al., J. Lightwave Tech. Vol. 4, NO. 4, pp. 615-627, 1995

SUMMARY OF THE INVENTION

Thus, in lens optics, optical coupling to photodiodes arranged in an array and each having a small junction diameter is difficult in terms of optical packaging. On the other hand, the optical waveguide/photodiode integrated structure disadvantageously fails to provide a sufficient responsivity in connection with the nature of the evanescent optical coupling.

In view of these problems, an object of the present invention is to provide an integrated optoelectronic module that is advantageously used to combine THz power using a large number of photodiodes arranged in an array and each having a very small junction area.

To achieve this object, an integrated optoelectronic module described in an embodiment includes a semiconductor substrate and a single-mode optical waveguide including a semiconductor with a signal input section at a first end, a multi-mode optical waveguide including a semiconductor connected to another end of the single-mode optical waveguide, and a photodiode disposed on and adjacent to the multi-mode interferometer waveguide and having at least one optical absorption layer section, the single-mode optical waveguide, the multi-mode interferometer waveguide, and the photodiode being stacked on the semiconductor substrate, wherein the multi-mode interferometer waveguide has a reflection section formed by partly grooving the multi-mode interferometer waveguide, and an optical signal propagating through the multi-mode interferometer waveguide is reflected by the reflection section and focused on the optical absorption layer section.

In the integrated optoelectronic module, preferably, the multi-mode interferometer waveguide is a semiconductor, and the reflection section is formed by grooving an inclined surface of the semiconductor forming the multi-mode interferometer waveguide. More preferably, a low-index material is filled into a cavity in the grooved section for flattening in such a manner that the grooved section is flush with the multi-mode interferometer waveguide. Furthermore, a metal reflection mirror or a multiple dielectric layer reflection mirror may be provided on the inclined surface of the reflection section.

Additionally, an integrated optoelectronic array described in an embodiment includes a 1×N (N is an integer) optical branching waveguide and the above-described integrated optoelectronic modules. The integrated optoelectronic modules are connected to respective N output sections of the 1×N optical branching waveguide formed on an identical semiconductor substrate.

Furthermore, an integrated optoelectronic antenna described in an embodiment includes an electric line and an antenna pattern which are connected to a photodiode in the above-described integrated optoelectronic module.

Further features of the present invention will become apparent from the following description of exemplary embodiments (with reference to the attached drawings).

BRIEF DESCRIPTION OF THE DRAWINGS

FIGS. 1A-1C are schematic diagrams illustrating an integrated optoelectronic module according to a first embodiment.

FIGS. 5A and 5B are schematic diagrams illustrating an integrated optoelectronic module according to a second embodiment.

FIGS. 8A and 8B are diagrams showing an example of optical coupling to a conventional antenna integrated photodiode using an optical lens.

DESCRIPTION OF THE EMBODIMENTS

Embodiments of the present invention will be described below in detail.

(First Embodiment)

Figure 1A:
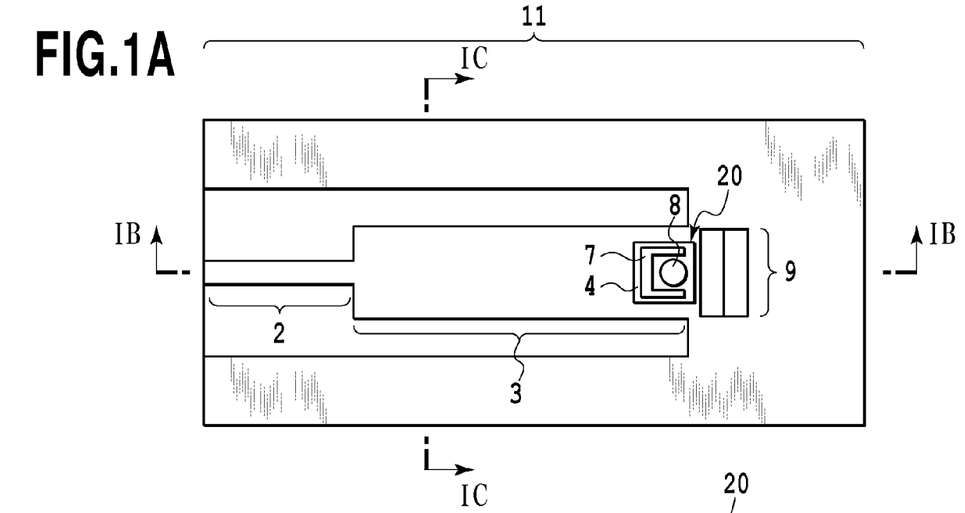
FIG. 1A is a top view.
Figure 1B:
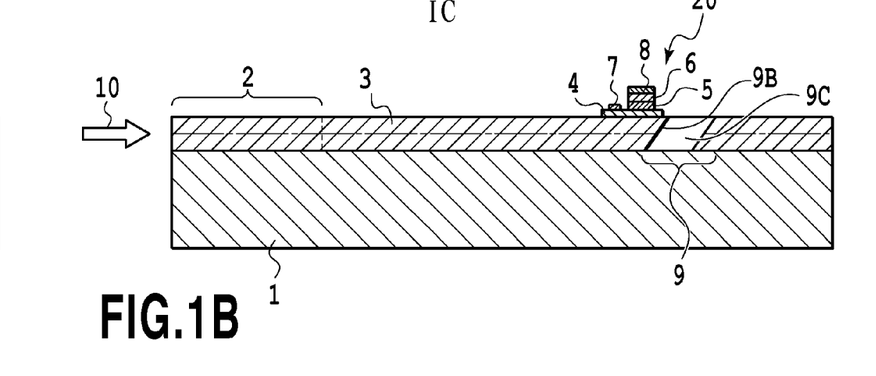
FIG. 1B is a cross-sectional view taken along line IB-IB.
Figure 1C:
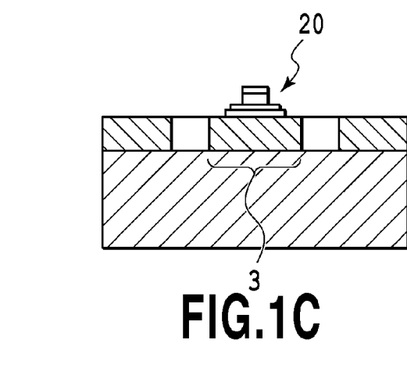
FIG. 1C is a cross-sectional view taken along line IC-IC.

FIGS. 1A-1c are schematic diagrams illustrating a first embodiment of an integrated optoelectronic module. FIG. 1A is a top view, FIG. 1B is a cross-sectional view taken along line IB-IB, and FIG. 1C is a cross-sectional view taken along line IC-IC. An integrated optoelectronic module 11 according to the present embodiment includes a semi-insulating InP substrate 1, a single-mode optical waveguide 2 and a multi-mode interferometer waveguide 3 which are stacked on the semi-insulating InP substrate 1, a photodiode 20 provided on the multi-mode interferometer waveguide 3, and a reflection mirror section (reflection section) 9. When an optical signal 10 is input to the integrated optoelectronic module 11 in the direction of an arrow, the signal light 10 propagates through the single-mode optical waveguide 2 and is then input to the multi-mode interferometer waveguide 3.

The single-mode optical waveguide 2 is configured such that clad layers are stacked over and under a core layer 51 and includes, for example, an InGaAsP core layer and InP clad layers disposed over and under the InGaAsP core layer. The multi-mode interferometer waveguide 3 has a layer configuration similar to the layer configuration of the single-mode optical waveguide 2, i.e., with clad layers being stacked over and under a core layer 52. The single-mode optical waveguide 2 and the multi-mode interferometer waveguide 3 have the same layer configuration but have different core layer widths, as shown in FIG. 1A. The multi-mode interferometer waveguide 3 can be configured to have a much larger width than the single-mode optical waveguide 2.

The multi-mode interferometer waveguide 3 according to the present embodiment has a waveguide core width and an adjusted waveguide core width so as to cause interference that forms a single imaging point. The imaging point herein refers to a point at which light intensities concentrate due to the interference effect of multi-mode interference light.

The reflection mirror section 9 includes a groove section 9C corresponding to a cavity formed by grooving a part of the multi-mode interferometer waveguide 3 so that a part of the core layer 52 of the multi-mode interferometer waveguide 3 forms an inclined surface 9B. A low-index material may be filled into the groove section 9C. The inclined surface 9B is inclined so as to reflect signal light having propagated through the core layer 52 of the multi-mode interferometer waveguide 3, toward the photodiode 20. A position where the reflection mirror section 9 is formed is preferably adjusted so as to focus the optical signal on the optical absorption layer 5 in the photodiode 20. This enables a reduction in the focusing area in the photodiode 20. Specifically, an optical path length from the point of reflection by the inclined surface 9B to the point of arrival at the photodiode 20 is adjusted so that the imaging point in an electric field intensity pattern in the optical signal is formed on the photodiode 20.

The photodiode 20 includes an n-type InP contact layer 4, an InGaAs optical absorption layer 5, and a p-type InGaAsP contact layer 6 stacked on one another and an n-electrode 7 and a p-electrode 8 each stacked on any of the n-type InP contact layer 4, the InGaAs optical absorption layer 5, and the p-type InGaAsP contact layer 6. The photodiode 20 has a function to convert light signal from the multi-mode interferometer waveguide 3 to electric signal in an optoelectronic manner. The photodiode 20 may be, for example, a back-illuminated type, but the detailed configuration of the photodiode 20 is not particularly limited. The photodiode 20 is staked on the multi-mode interferometer waveguide 3 at a position where the waveguide length is slightly shorter than a waveguide length corresponding to a single imaging point in the electric field intensity pattern in the multi-mode interferometer waveguide 3. Furthermore, the photodiode 20 may be provided to entirely or partly overlap the multi-mode interferometer waveguide 3.

The integrated optoelectronic module according to the present embodiment can be produced as described below. First, optical waveguide layers 2 and 3 and semiconductor layers 4, 5, and 6 forming the photodiode 20 are epitaxially grown on the semi-insulating InP substrate 1 using an MO-VPE method. The photodiode 20 including the semiconductor layers 4, 5, and 6 is not particularly constrained provided that the photodiode 20 has a photodiode structure.

The processing of the integrated optoelectronic module preferably starts with production of the photodiode section. This is because fine lithography is more easily carried out to allow the photodiode section to be accurately patterned when no groove forming the optical waveguide has been formed. Typically, the photodiode section is produced in the form of a double mesa by using chemical etching and a method for lifting off electrode metal.

Then, the single-mode optical waveguide 2 and the multi-mode interferometer waveguide 3 are simultaneously processed. For example, a deposited SiO$_2$ film is patterned by photolithography, and vertical grooving is carried out so as to enclose the periphery of the single-mode optical waveguide 2 and the multi-mode interferometer waveguide 3 by means of a reactive ion etching method through the SiO$_2$ film as an etching mask. Thus, a "mesa" optical waveguide is formed.

After the optical waveguides 2 and 3 are formed, grooving is carried out to form a reflection mirror section 9. The grooving is performed by etching. Either dry etching or wet etching may be used, but the resultant groove shape varies between the dry etching and the wet etching. In this case, slant milling is needed, and thus, a reactive ion-beam etching method is used which is more directional than the reactive ion etching method.

Although not shown in FIGS. 1A-1C, to facilitate lithography when a bias circuit and an output circuit in the photodiode 20 are electrically interconnected, BCB (Benzocyclobutene) is preferably applied to or filled into the groove around the single-mode light waveguide 2 and the multi-mode interferometer waveguide 3 and the groove 9C in the reflection mirror section 9 for flattening.

Then, a process in which an optical signal input to the integrated optoelectronic module is coupled to the photodiode 20 will be described. The optical signal input to the integrated optoelectronic module according to the present embodiment first passes through an input section of the single-mode light waveguide 2, propagates through the core layer 51 of the single-mode light waveguide 2, and enters the core layer 52 multi-mode interferometer waveguide 3.

Then, as described in NPL 3, the optical signal 10 in the multi-mode interferometer waveguide 3 regularly repeatedly varies the electric field intensity in a pattern determined by structural parameters for the multi-mode interferometer waveguide 3. In a general application of the multi-mode interferometer waveguide 3 of this type, a waveguide length involving M imaging points is selected, and the single-mode light waveguide 2 is connected again based on the selected waveguide length to implement a 1×M branching function. However, the present embodiment uses the multi-mode interferometer waveguide 3 without a branching function (M=1).

Then, the signal light having propagated through the core layer 52 of the multi-mode interferometer waveguide 3 impinges on the reflection mirror section 9 and is then reflected toward the photodiode 20. The photodiode 20 is stacked on the multi-mode interferometer waveguide 3 at a position where the corresponding waveguide length is slightly shorter than a waveguide length corresponding to a single imaging point in the electric field intensity pattern in the multi-mode interferometer waveguide 3. Thus, the signal light is efficiently coupled to the photodiode 20.

The above-described operation in the integrated optoelectronic module 11 is mainly achieved by the focusing effect of the multi-mode interferometer waveguide 3 and the utilization of the reflection mirror section 9 disposed near the photodiode 20. The optical signal having propagated through the multi-mode interferometer waveguide 3 has its propagation direction changed by the reflection mirror surface 9B to an upward direction (the direction in which the photodiode 20 is arranged) toward the center of the photodiode 20. The optical light finally reaches the optical absorption layer 5 in the photodiode 20. The position of the reflection mirror section 9 is adjusted so that the optical signal is focused on the optical absorption layer 5 in the photodiode 20.

That is, the signal propagating through the optical waveguide can be focused on the photodiode 20, having a very small junction area. In this case, the multi-mode interferometer waveguide 3 has a much larger width than the single-mode light waveguide 2, and thus, the photodiode 20 having a total area size equivalent to an about-10-micron square can be mounted. Therefore, the photodiode 20 may basically have a configuration similar to that of a normal back-illuminated type. Optical signals can be effectively input into fine back-illuminated photodiodes that are intended to be arrayed.

Figure 2:
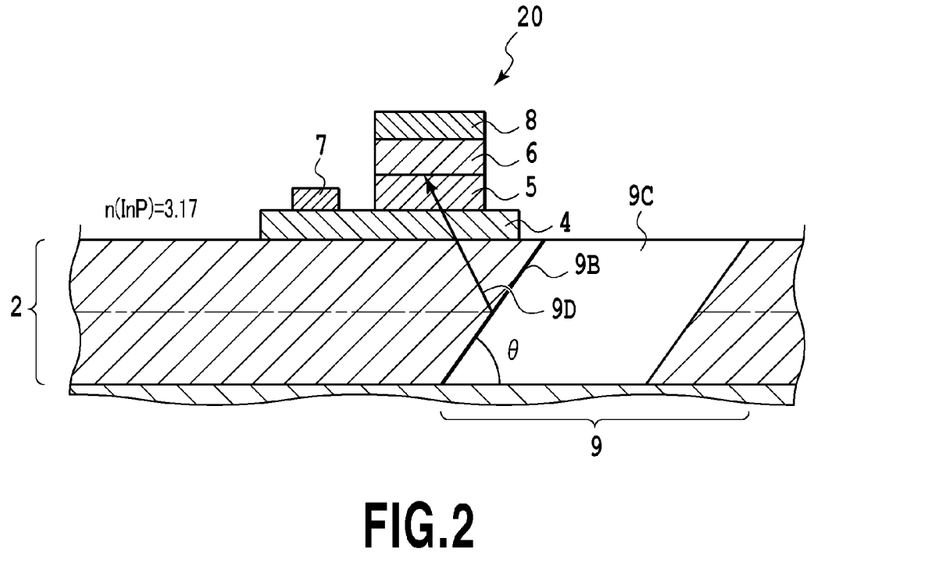
FIG. 2 is a diagram schematically showing how an optical signal is reflected by an inclined surface and propagates in a reflection direction.

FIG. 2 schematically shows how an optical signal in a core layer is reflected by the inclined surface 9B and propagates in a reflection direction 9D. A condition for maintaining total reflection with the groove section 9C filled with a dielectric depends on the optical refractive index of the semiconductor forming the core layer of the waveguide, the angle of the mirror, and the optical refractive index of the material filled into the groove section 9C. If the groove section 9C is air, the total reflection condition is established at the largest mirror inclination angle.

Figure 3:
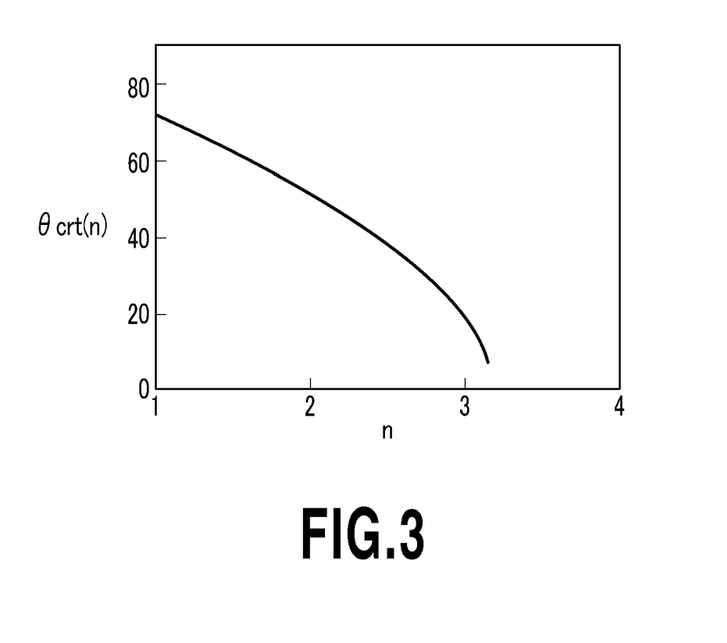
FIG. 3 is a diagram showing the results of calculations of the largest mirror inclination angle ($\theta$crt) at which total reflection can be maintained with respect to the optical refractive index of a material filled in a groove.

FIG. 3 shows the results of calculations of the largest mirror inclination angle (θcrt) at which total reflection can be maintained with respect to the optical refractive index of the material filled in the groove. In FIG. 3, the multi-mode interferometer waveguide 3 is assumed to have a refractive index n=3.17. It is understood from the results shown in FIG. 3 that even when a polymer material, for example, BCB or SiO2, is used for the semiconductor process, the mirror can be inclined by up to about 60° because the polymer material has a refractive index n=about 1.5. The reflection mirror can be formed without the need for secondary formation with metal or the like, thus facilitating the manufacture of the present integrated optoelectronic module.

Figure 4:
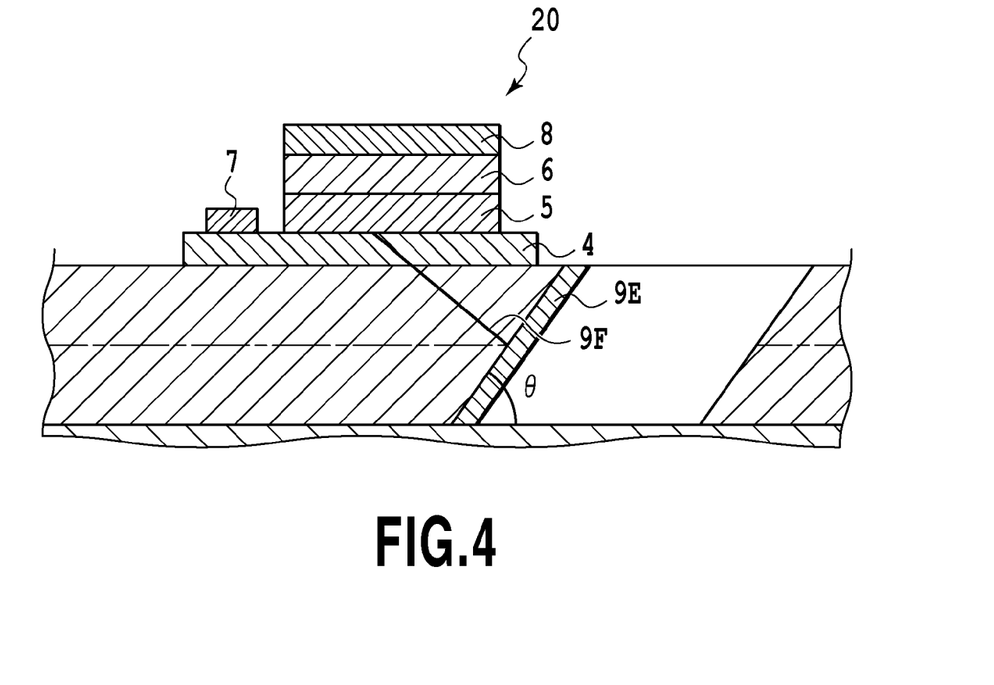
FIG. 4 is a diagram showing an example in which a metal reflection mirror is formed on the inclined surface, which corresponds to a grooved section.

The present embodiment has been described taking as an example the aspect in which nothing particular is added to the inclined surface 9B. However, a secondarily formed mirror such as a metal reflection mirror or a multiple dielectric layer reflection mirror may be used for the inclined surface 9B of the reflection mirror section 9. A metal reflection mirror 9E may be titanium, gold, or the like. FIG. 4 shows an example in which the metal reflection mirror 9E is formed on the inclined surface 9B, which is a grooved section. The use of the metal reflection mirror 9E enables an increase in the mirror inclination angle crt(n) to the extent that reflected light 9F is not coupled to a propagation mode in the multi-mode interferometer waveguide 3. The reflected light passes through the optical absorption layer at a shallow angle, thus enabling the light to be more efficiently absorbed. As a result, an optical input needed to obtain certain electric power can be reduced.

The integrated optoelectronic module according to the present embodiment is advantageously used when a large number of photodiodes each with a very small junction area are arranged in an array to combine THz power. The use of the integrated optoelectronic module according to the present embodiment avoids problems such as complicated adjustment involved in optical packaging based on the conventional technique using a lens optics and a failure to apply fine photodiodes when the photodiodes are of the conventional evanescent optical coupling type. The use of the integrated optoelectronic module according to the present embodiment allows sufficient optical coupling to be ensured even when a large number of fine photodiodes are arranged in an array.

Furthermore, as a technique for generating power in the THz frequency range (about 0.3 THz to about 3 THz), a generation technique using photodiodes is excellent in view of the simpleness of the technique and a broadband provided by the technique. However, this technique may disadvantageously fail to provide a sufficient power level at higher frequencies and involve a high noise level or a long measurement time. The use of the integrated optoelectronic module according to the present embodiment allows a significant increase in THz power and can thus be widely applied to practical fields such as THz imaging.

(Second Embodiment)

The first embodiment uses photodiodes with a single focusing section. However, the present embodiment uses a multi-mode interferometer waveguide with a waveguide width and a waveguide length adjusted so as to form a plurality of imaging points and a photodiode with a plurality of focusing sections to couple an optical signal to the plurality of focusing sections of the photodiode based on a branching function of the multi-mode interferometer waveguide. The remaining part of the configuration of the present embodiment is the same as the configuration of the integrated optoelectronic module according to the first embodiment and will thus not described below.

Figure 5A:
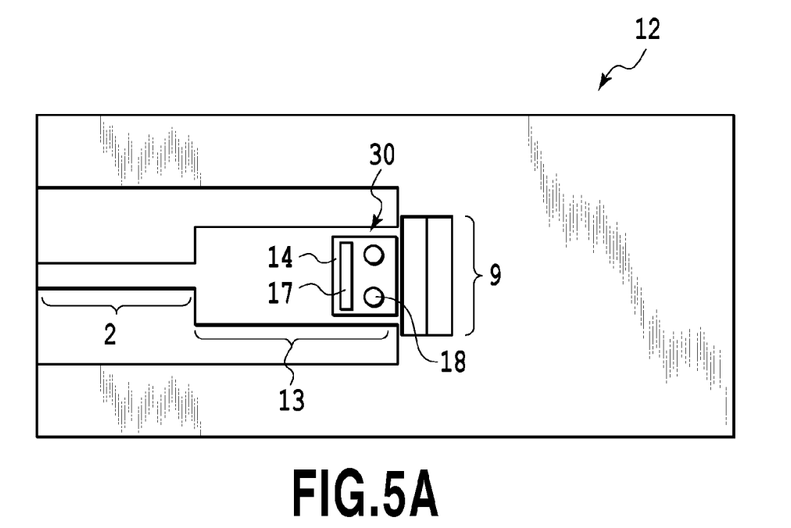
FIG. 5A is a top view.
Figure 5B:
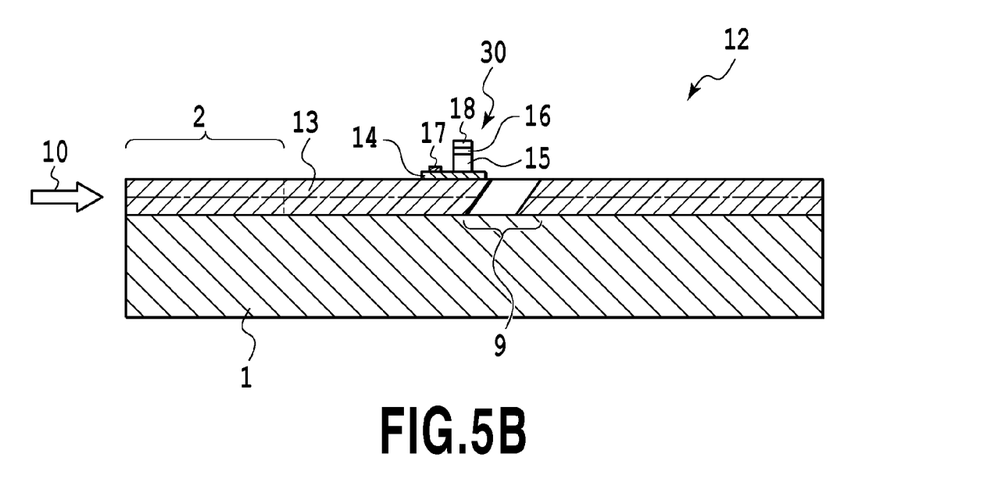
FIG. 5B is a cross-sectional view.

FIGS. 5A and 5B are diagrams showing an integrated optoelectronic module 12 according to the present invention. FIG. 5A is a top view, and FIG. 5B is a side view. As shown in FIGS. 5A and 5B, the integrated optoelectronic module 12 uses a multi-mode interferometer waveguide 13 with a waveguide width and a waveguide length adjusted so as to form two imaging points instead of the multi-mode interferometer waveguide 3, causing interference that forms a single imaging point according to the first embodiment.

A photodiode 30 preferably includes focusing sections (optical absorption layers 15) corresponding to the number of imaging points formed in the multi-mode interferometer waveguide 13. In the present embodiment, the photodiode 30 includes two focusing sections. The junction between the two focusing sections (optical absorption layers 15) is such that the two focusing sections can be configured as photodiodes which share an n-type InP contact layer 14 but which are electrically independent of each other. Specifically, as shown in FIG. 5, optical absorption layers 15, a p-type InGaAsP contact layer 16, and p-electrodes 18 which function electrically independently of one another, are stacked on one n-type InP contact layer 14.

Furthermore, a position where a reflection mirror section 9 is provided is adjusted such that imaging points of an interfering optical signal are formed in the focusing sections (optical absorption layers 15) of the photodiode 30 based on an optical path length from the point of reflection by the reflection mirror section 9 in the multi-mode interferometer waveguide 13 to the point of arrival at the photodiode 30.

An optical signal entering the integrated optoelectronic module 12 according to the present embodiment propagates through the single-mode light waveguide 2 and is then input to the multi-mode interferometer waveguide 13. The optical signal is then reflected toward the photodiode 30 by the reflection mirror section 9 provided at one end of the multi-mode interferometer waveguide 13. The signal light reflected from the multi-mode interferometer waveguide 13 by the reflection mirror section 9 and reaching the photodiode 30 forms imaging points in the respective two focusing sections (optical absorption layers 15). The two focusing sections (optical absorption layers 15) of the photodiode 30 can operate as electrically independent photodiodes to detect light.

The integrated optoelectronic module 12 according to the present embodiment not only exerts the same effects as those of the integrated optoelectronic module according to the first embodiment but also reduces the junction area of each of a plurality of photodiodes even when the total of the junction areas of the plurality of photodiodes is the same as the junction area of the photodiode according to the first embodiment. This reduces the RC constant to allow the integrated optoelectronic module to operate at high speed. Furthermore, self heating of the photodiode is more widely dispersed, enabling an increase in total operating current and thus in THz power.

(Third Embodiment)

Figure 6A:
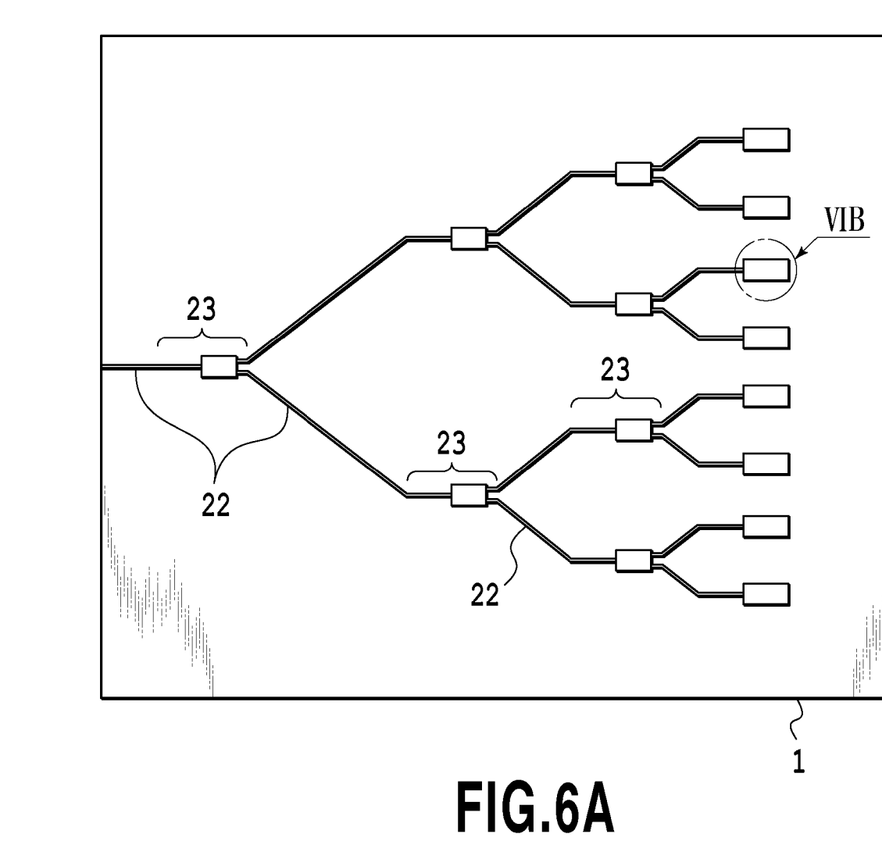
FIGS. 6A and 6B are diagrams showing an integrated optoelectronic array according to a third embodiment.
Figure 6B:
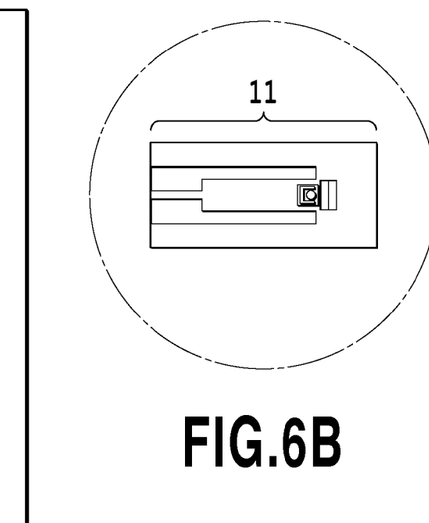

The first embodiment and the second embodiment describe the integrated optoelectronic modules that can effectively input optical signals into fine photodiodes intended to be arrayed. The photodiodes are arrayed by, for example, arranging the above-described integrated optoelectronic modules in a unit. FIG. 6A shows an example in which an integrated optoelectronic array is configured by arranging eight integrated optoelectronic modules according to the first embodiment. FIG. 6B shows a partly magnified view of FIG. 6A.

In FIG. 6A, the integrated optoelectronic array includes integrated optoelectronic modules 11 according to the first embodiment, a single-mode optical waveguide 22, and a 1×2 branching multi-mode interferometer waveguide 23. The single-mode optical waveguide 22 connects 1×2 branches of the multi-mode interferometer waveguide 23 together to form three-staged branching and thus a 1×8 optical branching waveguide. For example, the integrated optoelectronic module 11 according to the first embodiment is connected to each of the eight waveguides into which the multi-mode interferometer waveguide 23 branches. The number of branches 1×N (N is an integer) may be optional.

Production of the integrated optoelectronic array according to the third embodiment includes processing of the integrated optoelectronic module 11 according to the first embodiment or the integrated optoelectronic module 12 according to the second embodiment and simultaneous processing of the single-mode optical waveguide 22 and the multi-mode interferometer waveguide 23 which are optical branching waveguides. Furthermore, although not shown in FIG. 6, electric interconnects for a bias circuit and an output circuit in the photodiode, an impedance matching circuit, a planar antenna, and the like can be formed as necessary.

The integrated optoelectronic array according to the present embodiment significantly increases combine d THz power according to the number of arrays of photodiodes.

(Fourth Embodiment)

Figure 7:
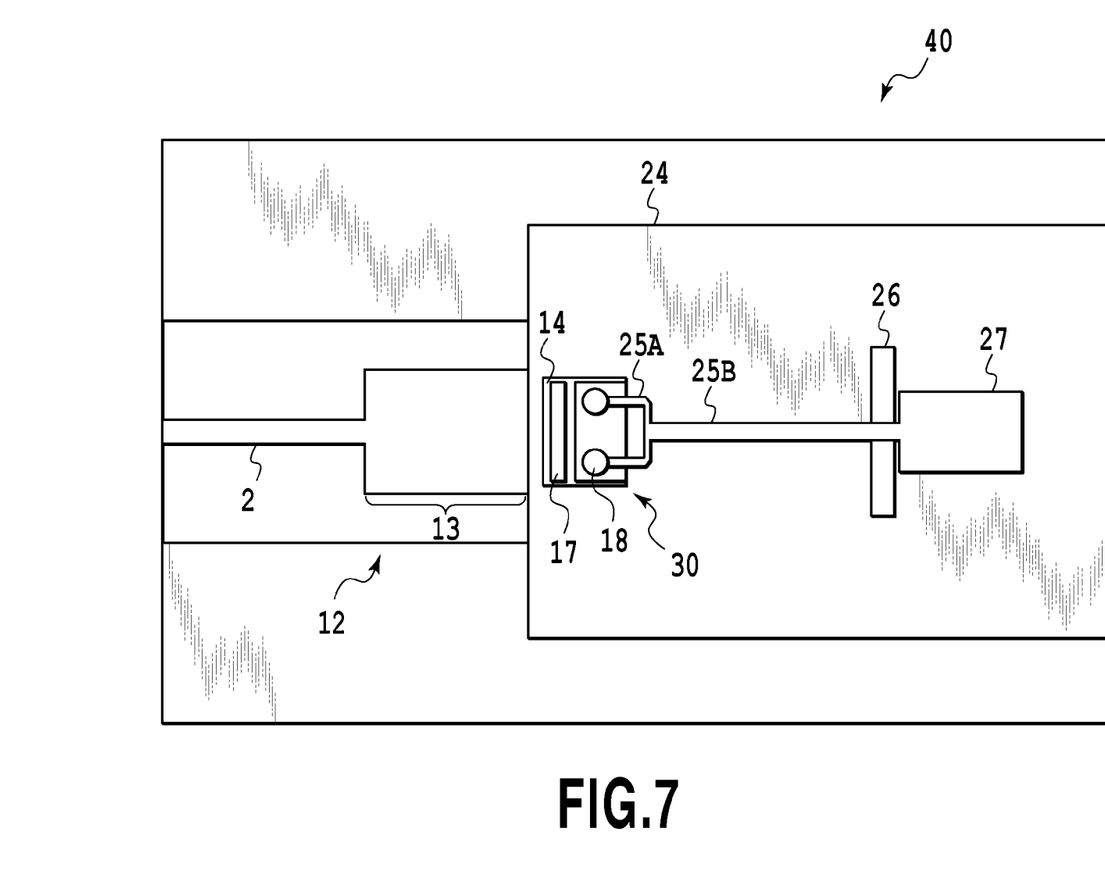
FIG. 7 is a diagram showing a planar antenna according to a fourth embodiment.

The present embodiment is an example of an integrated optoelectronic antenna with planar antennas integrated together on the structure according to the third embodiment. FIG. 7 shows a planar antenna according to the present embodiment. The integrated optoelectronic antenna according to the present embodiment includes an output line and an antenna pattern in addition to the integrated optoelectronic module 12 according to the second embodiment as shown in FIG. 7. In FIG. 7, the output line and the antenna pattern include a metal ground surface pattern 24 electrically connected to an n-electrode 14, a THz signal output line 25A and a signal output line 25B for a signal with combined power, which are formed of microstrip lines connected to p-electrodes 18 of individual photodiodes, a slot antenna pattern 26, and a bias pad 27 with a sufficient capacitance to the ground.

In an integrated optoelectronic antenna 40 shown in FIG. 7, an optical signal is input to the optical absorption layer (disposed under the p-electrode 18) of the photodiode, with a negative voltage applied to the ground surface 24 by the bias pad 27. As a result, THz power is generated and propagates through the microstrip lines 25A and 25B. Then, the THz power excites the slot antenna 26 and is emitted toward a lower surface of the antenna. The integrated optoelectronic antenna according to the fourth embodiment can of course be applied directly to the integrated optoelectronic array described in the third embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 11 and 12 Integrated optoelectronic modules
1. InP substrate
2. Single-mode optical waveguide
3 and 13 Multi-mode interferometer waveguide
20 and 30 Photodiodes
4 and 14 n-type InP contact layer
5 and 15 InGaAs optical absorption layers
6 and 16 p-type InGaAsP contact layer
7 and 17 n-electrodes
8 and 18 p-electrodes
9 Reflection mirror section
9B Inclined surface
9C Groove section
10 Optical signal
40 Integrated optoelectronic array

What is claimed is:

1. An integrated optoelectronic module comprising:
   a semiconductor substrate;
   a single-mode optical waveguide comprising a semiconductor core with a signal input section at a first end;
   a multi-mode interferometer waveguide comprising a semiconductor core connected to a second end of the core of the single-mode optical waveguide; and
   a photodiode stacked directly on the multi-mode interferometer waveguide and having at least one optical absorption layer section,
   wherein the single-mode optical waveguide and the multi-mode interferometer waveguide are stacked on the semiconductor substrate, and
   wherein the multi-mode interferometer waveguide comprises a reflection section formed by partly grooving the core of the multi-mode interferometer waveguide, so that an optical signal having propagated through the multi-mode interferometer waveguide is reflected by the reflection section and focused on the optical absorption layer section.

2. The integrated optoelectronic module according to claim 1, wherein the reflection section comprises an inclined surface of the core of the multi-mode interferometer waveguide.

3. The integrated optoelectronic module according to claim 2, wherein a low-index material is filled into a cavity in the grooved section for flattening in such a manner that the grooved section is flush with the multi-mode interferometer waveguide.

4. The integrated optoelectronic module according to claim 2, wherein a metal reflection mirror or a multiple dielectric layer reflection mirror is provided on the inclined surface of the reflection section.

5. The integrated optoelectronic module according to claim 3, wherein a metal reflection mirror or a multiple dielectric layer reflection mirror is provided on the inclined surface of the reflection section.

6. An integrated optoelectronic array comprising
   a 1×N (N is an integer) optical branching waveguide and
   a plurality of integrated optoelectronic modules, each according to claim 1,
   wherein the integrated optoelectronic modules are connected to respective N output sections of the 1×N optical branching waveguides formed on an identical semiconductor substrate.

7. An integrated optoelectronic antenna comprising an electric line and an antenna pattern which are connected to a photodiode in the integrated optoelectronic module according to claim 1.

8. An integrated optoelectronic array comprising:
a 1×N (N being an integer) optical branching waveguide; and
a plurality of integrated optoelectronic modules, each according to claim 1,
wherein the integrated optoelectronic modules are connected to respective N output sections of the 1×N optical branching waveguides formed on an identical semiconductor substrate.

9. An integrated optoelectronic antenna comprising:
an electric line;
an antenna pattern; and
an integrated optoelectronic module according to claim 1, the electric line and the antenna pattern being connected to the photodiode of the integrated optoelectronic module.

10. An integrated optoelectronic module comprising:
a semiconductor substrate;
a single-mode optical waveguide stacked on the semiconductor substrate, the single-mode optical waveguide being comprised of a semiconductor core extending from a signal input section at a first end to a second end;
a multi-mode interferometer waveguide stacked on the semiconductor substrate, the multi-mode interferometer waveguide being comprised of a semiconductor core connected to and extending from the second end of the core of the single-mode optical waveguide, a portion of the core of the multi-mode interferometer waveguide being grooved to form a reflection section; and
a photodiode stacked directly on the multi-mode interferometer waveguide, the photodiode having an optical absorption layer section,
wherein the optical absorption layer section and the reflection section are positioned such that when an optical signal is input into the signal input section of the single-mode optical waveguide, the signal propagates through the single-mode optical waveguide and into the multi-mode interferometer waveguide and is reflected by the reflection section of the multi-mode interferometer waveguide so as to become focused on the optical absorption layer section of the photodiode.

11. The integrated optoelectronic module recited in claim 10, wherein the reflection section has an inclined surface formed on the core of the multi-mode interferometer waveguide.

12. An integrated optoelectronic module comprising:
a semiconductor substrate;
a single-mode optical waveguide comprising a semiconductor core with a signal input section at a first end;
a multi-mode interferometer waveguide comprising a semiconductor core connected to a second end of the core of the single-mode optical waveguide; and
a photodiode stacked directly on the multi-mode interferometer waveguide and having at least one optical absorption layer section,
wherein the single-mode optical waveguide and the multi-mode interferometer waveguide are stacked on the semiconductor substrate, and
wherein the multi-mode interferometer waveguide comprises a reflection section formed by partly grooving the core of the multi-mode interferometer waveguide, so that an optical signal having propagated through the multi-mode interferometer waveguide is reflected by the reflection section of the multi-mode interferometer waveguide to a location at which the optical signal intensities concentrate due to the interference effect of multi-mode interference light, the location being positioned at the optical absorption layer section.

\* \* \* \* \*